United States Patent
Shimura

(10) Patent No.: US 12,276,967 B2
(45) Date of Patent: Apr. 15, 2025

(54) PROGRAM CREATION APPARATUS AND STORAGE MEDIUM

(71) Applicant: SEIKO EPSON CORPORATION, Tokyo (JP)

(72) Inventor: Yuma Shimura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 217 days.

(21) Appl. No.: 17/848,446

(22) Filed: Jun. 24, 2022

(65) Prior Publication Data

US 2022/0413468 A1 Dec. 29, 2022

(30) Foreign Application Priority Data

Jun. 25, 2021 (JP) ................................. 2021-105469

(51) Int. Cl.
G05B 19/4155 (2006.01)
B25J 9/16 (2006.01)
B25J 11/00 (2006.01)

(52) U.S. Cl.
CPC .......... *G05B 19/4155* (2013.01); *B25J 9/163* (2013.01); *B25J 11/0065* (2013.01); *G05B 2219/50391* (2013.01)

(58) Field of Classification Search
CPC ...... G05B 19/4155; G05B 2219/50391; G05B 2219/40392; G05B 2219/40518; B25J 9/163; B25J 11/0065; B25J 9/1664; B25J 9/1671; Y02P 90/02

See application file for complete search history.

(56) References Cited

U.S. PATENT DOCUMENTS

| | | | |
|---|---|---|---|
| 7,002,585 B1 * | 2/2006 | Watanabe | B25J 9/1671 345/475 |
| 8,779,715 B2 * | 7/2014 | Kassow | B25J 9/1671 318/568.1 |
| 10,577,810 B2 * | 3/2020 | Telleria | B05B 13/0431 |
| 2002/0072297 A1 * | 6/2002 | Kennerknecht | B24B 27/0038 451/5 |
| 2004/0193319 A1 * | 9/2004 | Gross | B25J 9/0093 700/245 |
| 2009/0289591 A1 * | 11/2009 | Kassow | B25J 9/1671 901/3 |
| 2015/0112482 A1 * | 4/2015 | Kuwahara | G06N 20/00 901/50 |
| 2016/0354933 A1 * | 12/2016 | Sato | B25J 9/1633 |
| 2018/0036883 A1 * | 2/2018 | Nishitani | B25J 9/1671 |
| 2018/0117758 A1 * | 5/2018 | Wang | B25J 9/0081 |

(Continued)

FOREIGN PATENT DOCUMENTS

| | | |
|---|---|---|
| CN | 110116371 A | 8/2019 |
| JP | 2017-064844 A | 4/2017 |
| JP | 2019-177422 A | 10/2019 |

*Primary Examiner* — Jason Holloway
*Assistant Examiner* — Madison B Emmett
(74) *Attorney, Agent, or Firm* — Harness, Dickey & Pierce, P.L.C.

(57) ABSTRACT

A program creation apparatus acquires a work sequence executed by a robot, and creates a motion program based on the work sequence and a work information file in which information on work contained in the work sequence is recorded. Further, the work sequence is corrected from the work information file, and a new motion program based on a corrected new work sequence is created.

5 Claims, 6 Drawing Sheets

(56) References Cited

U.S. PATENT DOCUMENTS

| | | | |
|---|---|---|---|
| 2018/0354133 A1* | 12/2018 | Hirabayashi | B25J 9/1666 |
| 2019/0240804 A1 | 8/2019 | Zhang | |
| 2019/0240833 A1* | 8/2019 | Kimura | B25J 9/1664 |
| 2019/0299400 A1 | 10/2019 | Nagashima | |
| 2021/0086374 A1* | 3/2021 | Brandt | B25J 9/1674 |
| 2021/0138643 A1* | 5/2021 | Wee | B25J 9/1633 |
| 2021/0197391 A1* | 7/2021 | Ohnishi | B25J 19/023 |
| 2022/0113711 A1* | 4/2022 | Nakayama | G05B 19/4207 |

\* cited by examiner

FIG. 3

| Group | PList | Color | Coordinate | Direction | Force | Firmness | Speed | rpm |
|---|---|---|---|---|---|---|---|---|
| 0 | P(300)-P(315) | | Tool | Fz | -5 | 2 | 30 | 1000 |
| 1 | P(316)-P(340) | | Tool | Fz | -5 | 10 | 50 | 3000 |
| 2 | P(341)-P(350) | | Tool | Fz | -10 | 5 | 250 | 3000 |
| 3 | P(351)-P(360) | | Tool | Fz | -5 | 10 | 300 | 3000 |
| 4 | P(361)-P(365) | | Tool | Fz | -3 | 10 | 30 | 1000 |
| - | - | | Tool | - | - | - | - | - |
| - | - | | Tool | - | - | - | - | - |
| - | - | | Tool | - | - | - | - | - |

FIG. 5

```
`****************************************************************************************
`****************************************************************************************
`#0
`Go P(300)(Not polishing)
`Check and modify the offset direction and offset amount in the .inc file.
`****************************************************************************************
`****************************************************************************************

If not p_test0527_initspd Then Exit Function
        Select ALLOFFSETDIR
                Case "+TLX"
                        `Go P(300)/(LOCALNUM)-TLZ(OFFSETDIST0)+TLX(ALLOFFSETDIST)
                Case "-TLX"
                        `Go P(300)/(LOCALNUM)-TLZ(OFFSETDIST0)-TLX(ALLOFFSETDIST)
                Case "+TLY"
                        `Go P(300)/(LOCALNUM)-TLZ(OFFSETDIST0)+TLY(ALLOFFSETDIST)
                Case "-TLY"
                        `Go P(300)/(LOCALNUM)-TLZ(OFFSETDIST0)-TLY(ALLOFFSETDIST)
                Case "+TLZ"
                        `Go P(300)/(LOCALNUM)-TLZ(OFFSETDIST0)+TLZ(ALLOFFSETDIST)
                Case "-TLZ"
                        `Go P(300)/(LOCALNUM)-TLZ(OFFSETDIST0)-TLZ(ALLOFFSETDIST)
        Send ifdef DEBUGMODE
                If Not p_PAUSE(progname$, 1) Then Exit Function
        #endif `****************************************************************************************
`****************************************************************************************
`#1
`Move P(300)-P(315)
`FC(0)
`Setting the force sensing parameters.
`Check and modify the parameters in the .inc file.
`Parameters:tatget force, firmness, movespeed, T1/2 enabled, T1/2 Damper, T1/2 Mass
`****************************************************************************************
`****************************************************************************************

FSet FC((0)).Enabled, False, False, True, False, False, False
        FSet FC((0)).Fz_TargetForce, TARGETFORCE0
        FSet FC((0)).Fz, 0, FIRMNESS0, FIRMNESS0
If T1Enabled0 = True Then
                Fset FC((0)).Tx_Enabled, True
                Fset FC((0)).Tx_TargetForce, 0
                Fset FC((0)).Tx, 0, T1DAMPAPER0. T1MASS0
        Endlf If T2Enabled0 = True Then
                Fset FC((0)).Ty_Enabled, True
                Fset FC((0)).Ty_TargetForce, 0
                Fset FC((0)).Ty, 0, T2DAMPAPER0. T2MASS0
        Endlf If Not p_setlimit(0) Then Exit Function
```

FIG. 6

| | Force Senser FSNo. | Tool /Local /ECP /MP No. | Target Pos Direction Offset | Target Pos Direction Offset | Start Pos EndPos | | Group | Direction | Force | Firmness | SpeedS | rpm | T1 | T1Enabled | T1Damper | T1Mass | T2 | T2Enabled | T2Damper | T2Mass |
|---|---|---|---|---|---|---|---|---|---|---|---|---|---|---|---|---|---|---|---|---|
| Reset | | | | | | | | | | | | | | | | | | | | |
| Set | | | | | | | | | | | | | | | | | | | | |
| Go | | | | | | | | | | | | | | | | | | | | |
| Move | | | | | | | | | | | | | | | | | | | | |
| Move | | | | | | | | | | | | | | | | | | | | |
| Reset | 1 | | | | | | | | | | | | | | | | | | | |
| Set | | 14 | | | | | | | | | | | | | | | | | | |
| Go | | | | | 300-TLZ | 20 | 0 | Fz | | 2 | 30 | 1000 | Tx | FALSE | -1 | -1 | Ty | FALSE | -1 | -1 |
| Move | | | | | 300 | 315 | 1 | Fz | -5 | 10 | 50 | 3000 | Tx | FALSE | -1 | -1 | Ty | FALSE | -1 | -1 |
| Move | | | | | 316 | 340 | 2 | Fz | -5 | 5 | 250 | 3000 | Tx | FALSE | -1 | -1 | Ty | FALSE | -1 | -1 |
| Move | | | | | 341 | 350 | | | -10 | | | | | | | | | | | |
| Wait | 5 | | | | | | | | | | | | | | | | | | | |
| Move | | | | | 351 | 360 | 3 | Fz | -5 | 10 | 300 | 3000 | Tx | FALSE | -1 | -1 | Ty | FALSE | -1 | -1 |
| Move | | | | | 361 | 365 | 4 | Fz | -3 | 10 | 30 | 1000 | Tx | FALSE | -1 | -1 | Ty | FALSE | -1 | -1 |
| Go | | | | | 365-TLZ | 20 | | | | | | | | | | | | | | |

PROGRAM CREATION APPARATUS AND STORAGE MEDIUM

PROGRAM CREATION APPARATUS AND STORAGE MEDIUM

The present application is based on, and claims priority from JP Application Serial Number 2021-105469, filed Jun. 25, 2021, the disclosure of which is hereby incorporated by reference herein in its entirety.

BACKGROUND

1. Technical Field

The present disclosure relates to a program creation apparatus and a program.

2. Related Art

For example, as disclosed in JP-A-2017-64844, in related art, program automatic creation apparatuses creating motion programs for robots to execute work on objects are known. In the program automatic creation apparatus disclosed in JP-A-2017-64844, steps of work are created as a flowchart and a motion program is automatically generated based on the created flowchart.

However, not all users using motion programs created by the program automatic creation apparatus necessarily have detailed knowledge about the programs, it is hard for users having insufficient knowledge about the programs to understand and grasp the work from the motion programs.

SUMMARY

A program creation apparatus according to an aspect of the present disclosure acquires a work sequence executed by a robot, and creates a motion program based on the work sequence and a work information file in which information on work contained in the work sequence is recorded.

A non-transitory computer-readable storage medium storing a program according to an aspect of the present disclosure acquires a work sequence executed by a robot, and creates a motion program based on the work sequence and a work information file in which information on work contained in the work sequence is recorded.

BRIEF DESCRIPTION OF THE DRAWINGS

FIG. 3 shows an example of a window displayed by the program creation apparatus.

FIG. 5 shows part of a motion program.

FIG. 6 shows part of a work information file.

DESCRIPTION OF EXEMPLARY EMBODIMENTS

As below, a program creation apparatus and a program according to the present disclosure will be explained in detail based on preferred embodiments shown in the accompanying drawings.

Figure 1:
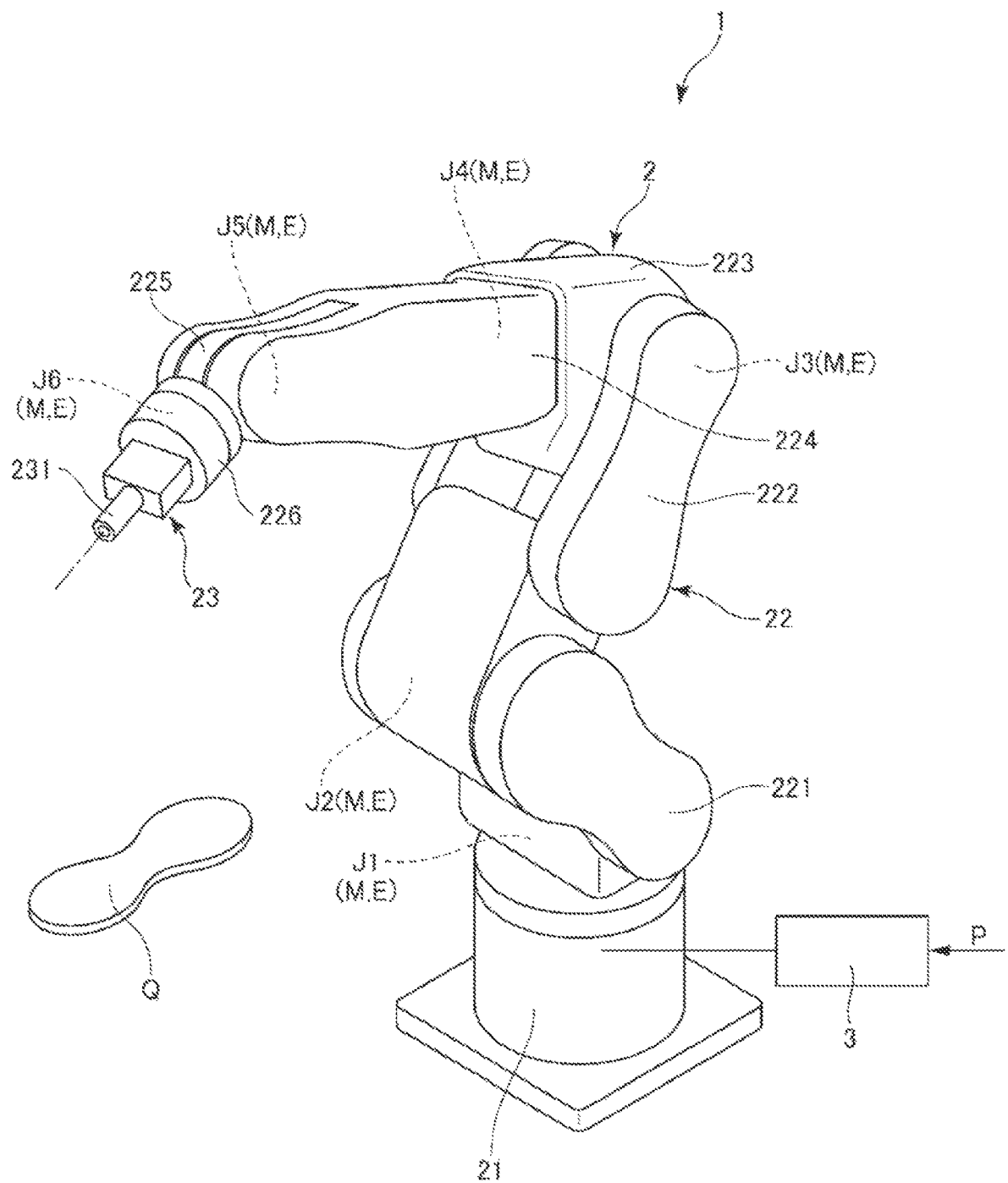
FIG. 1 is a perspective view showing an overall configuration of a robot system according to a preferred embodiment.
Figure 2:
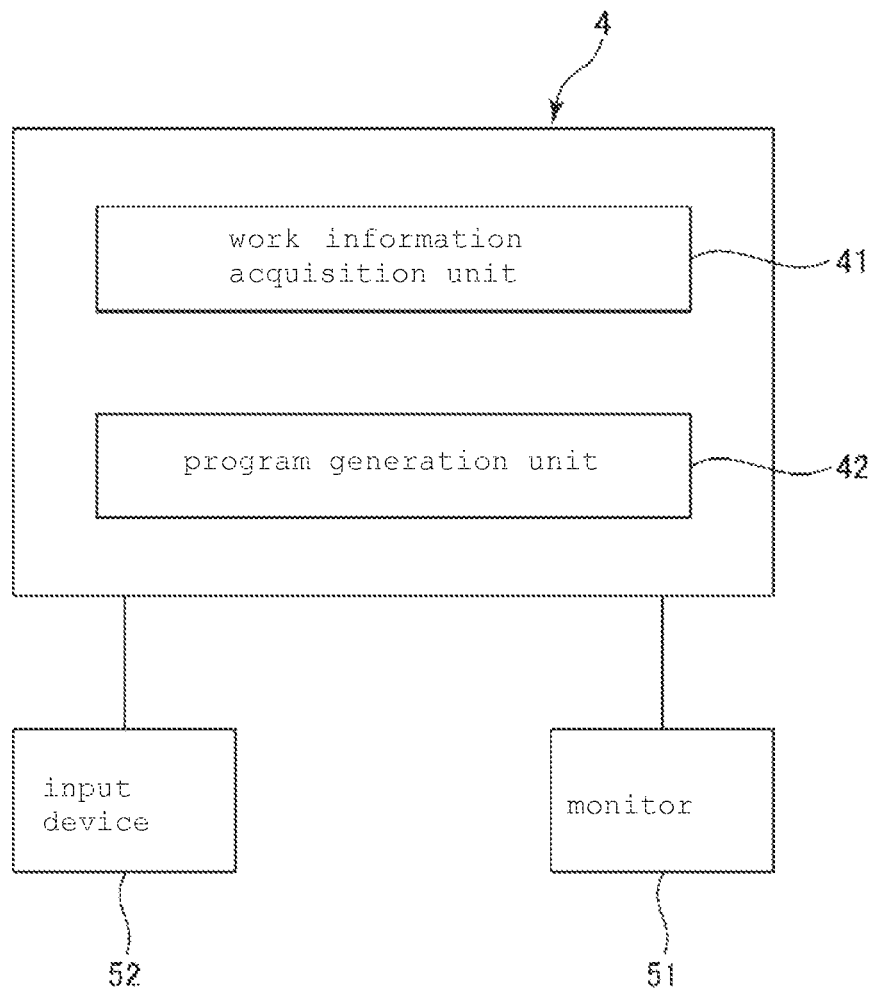
FIG. 2 is a block diagram showing a program creation apparatus.
Figure 4:
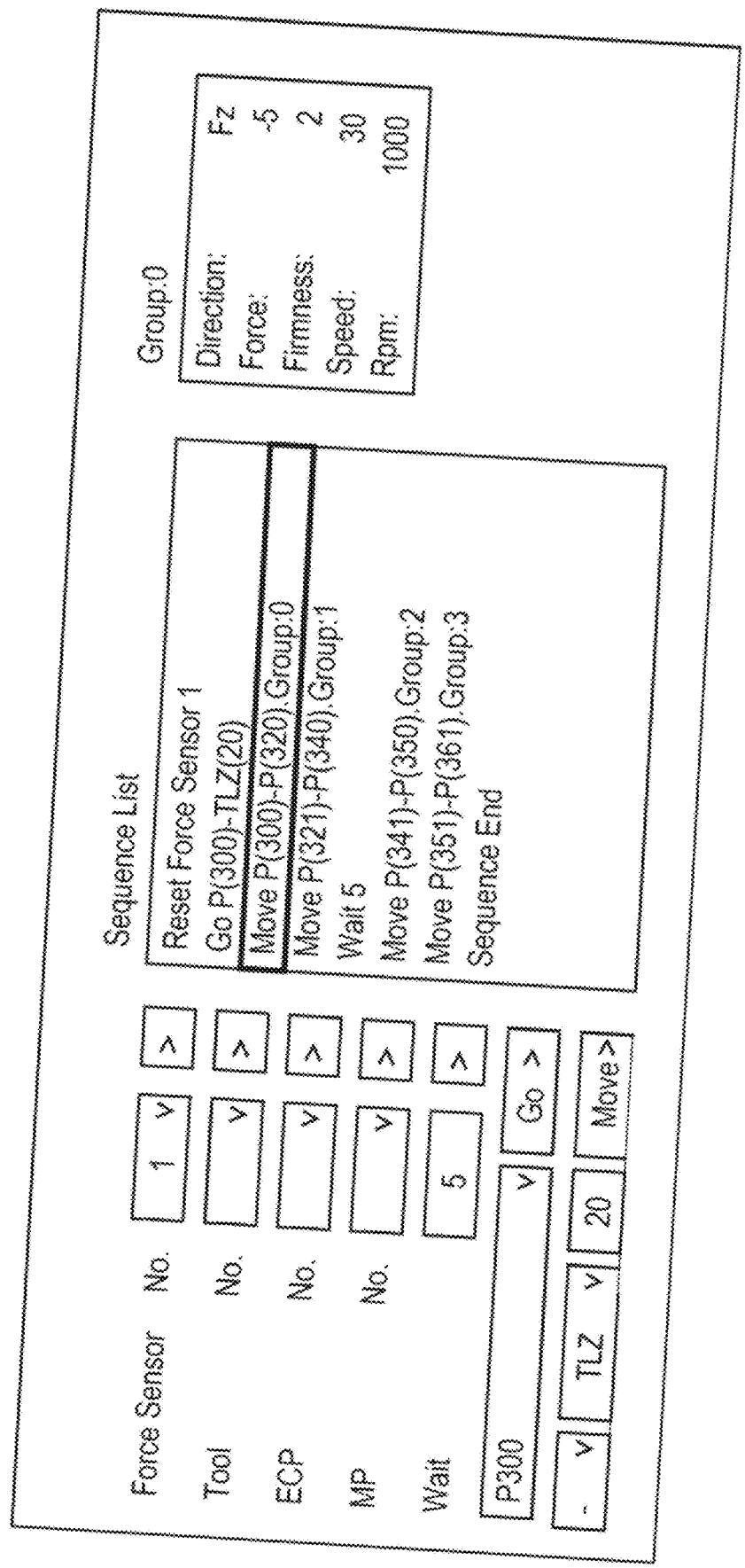
FIG. 4 shows an example of a window displayed by the program creation apparatus.

FIG. 1 is a perspective view showing an overall configuration of a robot system according to a preferred embodiment. FIG. 2 is a block diagram showing a program creation apparatus. FIGS. 3 and 4 respectively show examples of windows displayed by the program creation apparatus. FIG. 5 shows part of a motion program. FIG. 6 shows part of a work information file.

Prior to the explanation of a program creation apparatus 4 automatically creating a motion program P for driving a robot, a robot system 1 driven based on the motion program P automatically created by the program creation apparatus 4 will be briefly explained. As shown in FIG. 1, the robot system 1 has a robot 2 and a robot control apparatus 3 controlling driving of the robot 2 based on the motion program P.

The robot 2 is a six-axis robot having six drive axes. The robot 2 has a base 21 and a robot arm 22 pivotably coupled to the base 21, and an end effector 23 is attached to the distal end portion of the robot arm 22.

The robot arm 22 is a robotic arm in which a plurality of arms 221, 222, 223, 224, 225, 226 are pivotably coupled and includes six joints J1 to J6. Of the joints, the joints J2, J3, J5 are bending joints and the joints J1, J4, J6 are twisting joints. Further, motors M and encoders E are respectively provided in the joints J1, J2, J3, J4, J5, J6.

The end effector 23 is coupled to the arm 226. The end effector 23 is detachable from the arm 226 and one suitable for work executed by the robot 2 may be selected and attached. The end effector 23 of the embodiment has an abrasive wheel 231 driven to rotate, and the robot 2 executes polishing work to smooth the surface of an object Q.

As above, the robot 2 is explained, however, the configuration of the robot 2 is not particularly limited. For example, the robot 2 may be a scalar robot (horizontal articulated robot), a dual-arm robot, or the like. Further, the robot 2 may be fixed to a floor or the like to be immovable or fixed to a mobile apparatus such as an automated guided vehicle (AGV) to be movable.

The robot control apparatus 3 controls driving of the robot system 1 based on the motion program P automatically created by the program creation apparatus 4.

The robot control apparatus 3 consists of e.g. a computer and includes a processor processing information, a memory communicably connected to the processor, and an external interface for coupling to an external apparatus. Various programs that can be executed by the processor are stored in the memory, and the processor may read and execute the various programs stored in the memory.

As above, the robot system 1 is briefly explained. Next, the program creation apparatus 4 creating the motion program P will be explained. The program creation apparatus 4 consists of e.g. a computer and includes a processor processing information, a memory communicably connected to the processor, and an external interface for coupling to an external apparatus. A program PP that can be executed by the processor is stored in the memory, and the processor may read and execute the program PP. The program PP is software automatically creating the motion program P and hardware with the software installed therein is the program creation apparatus 4.

As shown in FIG. 2, the program creation apparatus has a work information acquisition unit 41 acquiring information on work executed by the robot 2, and a program generation unit 42 automatically generating the motion program P based on the information on the work acquired by the work information acquisition unit 41. Further, a monitor 51 as a display device and an input device 52 such as a keyboard or a mouse is coupled to the program creation apparatus 4.

As a first step, for example, the work information acquisition unit 41 displays an input window (graphic user interface) shown in FIG. 3 on the screen of the monitor 51 and receives a motion executed by the robot 2 via the input device 52 from the user.

The received motion is not particularly limited. In the example shown in FIG. 3, the user may assign one motion to one "Group" and may input and designate "PList" showing a start point and an end point of a movement of the end effector 23, "Coordinate" showing a coordinate used in "PList", "Direction" showing a pressing direction of the end effector 23 on the object Q, "Force" showing a pressing force of the end effector 23 on the object Q, "Firmness" showing firmness in force control, "Speed" showing a movement speed of the end effector 23, and "rpm" showing a rotation speed of the abrasive wheel 231. That is, the start point and the end point shown by "PList", the coordinate shown by "Coordinate", the pressing direction shown by "Direction", the pressing force shown by "Force", the firmness shown by "Firmness", the movement speed shown by "Speed", and the rotation speed shown by "rpm" are examples of information on work and a work sequence contains these. In the example shown in FIG. 3, five of Group 0, Group 1, Group 2, Group 3, Group 4 are created by the user.

After receiving the motion input from the user, the work information acquisition unit 41, as the second step, displays an input window (graphic user interface) as shown in FIG. 4 on the screen of the monitor 51 and creates a work sequence according to an instruction from the user via the input device 52. In this regard, the user may determine the order of execution of Group 0, Group 1, Group 2, Group 3, Group 4 set at the first step, and another motion may intervene between the successive Groups.

The work sequence shown in FIG. 4 is to execute in the order of Group 0, Group 1, Group 2, Group 3, and further, initialize a force sensor (not shown) provided in the robot arm 22 before execution of Group 0, move the end effector 23 from P(300) as a start position of Group 0 to a location slightly apart, and, after the end of Group 1, wait for five seconds and start Group 2.

The program generation unit 42 creates the motion program P for driving the robot based on the work sequence created according to an instruction from the user at a second step. Further, the program generation unit 42 creates the motion program P and creates a work information file SF containing information on work contained in the work sequence. The work information file SF may be displayed on the screen of the monitor 51 according to an instruction from the user. FIG. 5 shows an example of the motion program P and FIG. 6 shows an example of the work information file SF.

As shown in FIG. 6, in the work information file SF, work sequences contained in the motion program P are displayed in a list. More specifically, work is described on a time-series basis in the vertical direction and various parameters (PList, Coordinate, Direction, Force, Firmness, Speed, rpm, etc.) as information on the respective work are described in the horizontal direction. Therefore, according to the work information file SF, the user may easily confirm the work sequence contained in the motion program P.

Users having sufficient knowledge about the program may confirm the work sequence from the description of the motion program P. However, a certain amount of time is taken for searching for the respective work from the motion program P. Further, not all users necessarily have the sufficient knowledge about the program, and it is difficult for users having insufficient knowledge to confirm the work sequence from the motion program P and mistakes in confirmation are easily caused.

On the other hand, according to the work information file SF formed by extraction and filing of only the work sequences, not only users having sufficient knowledge but also users having insufficient knowledge may confirm the work sequence contained in the motion program P easily and clearly in a short time.

Further, the program creation apparatus 4 (program PP) may restore the work sequence from the work information file SF into a correctable condition according to an instruction from the user. When the work sequence is corrected by the user in the condition, the program creation apparatus 4 (program PP) creates a new motion program P based on a corrected new work sequence.

For example, the program creation apparatus 4 (program PP) displays input windows (graphic user interfaces) shown in FIGS. 3 and 4 on which the information contained in the work information file SF is reflected on the screen of the monitor 51 according to an instruction from the user, and receives changes of the parameters contained in the respective motions, changes of the order of execution of the respective motions, etc. from the user via the input device 52. Then, the program creation apparatus 4 (program PP) creates new motion program P and work information file SF based on a corrected new work sequence.

As described above, according to the configuration in which the work sequence in the motion program P is correctable from the work information file SF and, not only users having sufficient knowledge but also users having insufficient knowledge may easily correct the motion program P. However, the configuration is not limited to that. The work sequence in the motion program P may be uncorrectable from the work information file SF.

Further, the program creation apparatus 4 (program PP) may select information contained in the work information file SF according to an instruction from the user. That is, in FIG. 6, the respective parameters PList, Coordinate, Direction, Force, Firmness, Speed, rpm are described with respect to each work, however, another parameter may be added or at least one of these parameters may be omitted. According to the configuration, only the necessary information for the user may be contained in the work information file SF, and the confirmation of the work sequence via the work information file SF may be easier. Note that, the configuration is not limited to that. The information contained in the work information file SF may be unselectable.

As above, the program creation apparatus 4 and the program PP are explained. As described above, the program creation apparatus 4 acquires the work sequence executed by the robot 2, and creates the motion program P based on the work sequence and the work information file SF in which the information on the work contained in the work sequence is recorded. Thereby, the work sequence in the motion program P may be confirmed in the work information file SF and, not only users having sufficient knowledge but also users having insufficient knowledge may confirm the work sequence easily and clearly in a short time.

Further, as described above, the program creation apparatus 4 may correct the work sequence from the work information file SF and creates a new motion program P based on the corrected new work sequence. Thereby, the correction of the motion program P is easier.

Furthermore, as described above, the program creation apparatus 4 may select the information contained in the work information file. According to the configuration, only the necessary information for the user may be contained in the work information file SF, and the confirmation of the work sequence via the work information file SF is easier.

As described above, the work sequence contains the polishing work to polish the object Q using the abrasive wheel 231, and the information on the work contained in the work sequence contains at least one of the direction in which the abrasive wheel 231 is pressed against the object Q (Direction), the pressing force (Force), the firmness in force control (Firmness), the movement speed of the abrasive wheel 231 (Speed), and the rotation speed of the abrasive wheel 231 (rpm). Thereby, the sequence of the polishing work may be easily confirmed.

As described above, the program PP acquires the work sequence executed by the robot 2, and creates the motion program P based on the work sequence and the work information file SF in which the information on the work contained in the work sequence is recorded. Thereby, the work sequence in the motion program P may be confirmed in the work information file SF and, not only users having sufficient knowledge but also users having insufficient knowledge may confirm the work sequence easily and clearly in a short time.

As above, the program creation apparatus and the program according to the present disclosure are explained based on the illustrated embodiments, however, the present disclosure is not limited to those. The configurations of the respective parts may be replaced by arbitrary configurations having the same functions. Further, any other configuration may be added to the present disclosure. Furthermore, the respective embodiments may be appropriately combined.

What is claimed is:

1. A program creation apparatus comprising:
 a memory configured to store a program; and
 a processor configured to execute the program so as to:
  receive operation information relating to a plurality of operations of a robot, the operation information including:
   a start position and an end position of an end effector of the robot;
   a coordinate indicating the start position and the end position;
   a pressing direction along which the end effector presses an object;
   a pressing force that the end effector uses when the end effector presses the object;
   a movement speed of the end effector; and
   a rotation speed of a tool held by the end effector, wherein each of the plurality of operations is performed by the robot based on the operation information having specific values relating to the start position and the end position, the coordinate, the pressing direction, the pressing force, the movement speed, and the rotation speed;
  generate a plurality of operation groups, each of the plurality of operation groups being assigned by one of the plurality of operations;
  determine a waiting period of time between two adjacent operation groups of the plurality of operation groups;
  generate a work sequence executed by the robot based on the plurality of operation groups and the waiting period of time; and
  create a motion program based on the work sequence and a work information file in which the operation information contained in the work sequence is recorded.

2. The program creation apparatus according to claim 1, wherein
 the work sequence is corrected from the work information file, and
 a new motion program based on a corrected new work sequence is created.

3. The program creation apparatus according to claim 1, wherein
 the operation information contained in the work information file is selectable.

4. The program creation apparatus according to claim 3, wherein
 the work sequence contains polishing work to polish the object using an abrasive wheel as the tool, and
 the operation information contains the pressing direction in which the abrasive wheel is pressed against the object, the pressing force, the movement speed of the abrasive wheel, and the rotation speed of the abrasive wheel.

5. A non-transitory computer-readable storage medium storing a program for causing a computer to execute a process by a processor so as to perform the steps of:
 receiving operation information relating to a plurality of operations of a robot, the operation information including:
  a start position and an end position of an end effector of the robot;
  a coordinate indicating the start position and the end position;
  a pressing direction along which the end effector presses an object;
  a pressing force that the end effector uses when the end effector presses the object;
  a movement speed of the end effector; and
  a rotation speed of a tool held by the end effector, wherein each of the plurality of operations is performed by the robot based on the operation information having specific values relating to the start position and the end position, the coordinate, the pressing direction, the pressing force, the movement speed, and the rotation speed;
 generating a plurality of operation groups, each of the plurality of operation groups being assigned by one of the plurality of operations;
 determining a waiting period of time between two adjacent operation groups of the plurality of operation groups;
 generating a work sequence executed by the robot based on the plurality of operation groups and the waiting period of time; and
 creating a motion program based on the work sequence and a work information file in which the operation information contained in the work sequence is recorded.

* * * * *